(12) United States Patent
Abrishamkar

(10) Patent No.: US 7,009,954 B2
(45) Date of Patent: Mar. 7, 2006

(54) WIRELESS COMMUNICATIONS RECEIVER EMPLOYING A UNIQUE COMBINATION OF QUICK PAGING CHANNEL SYMBOLS TO FACILITATE DETECTION OF A PRIMARY PAGING CHANNEL

(75) Inventor: Farrokh Abrishamkar, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 791 days.

(21) Appl. No.: 09/761,342

(22) Filed: Jan. 16, 2001

(65) Prior Publication Data

US 2001/0044313 A1    Nov. 22, 2001

Related U.S. Application Data

(60) Provisional application No. 60/176,463, filed on Jan. 17, 2000.

(51) Int. Cl.
*H04Q 7/20* (2006.01)
(52) U.S. Cl. ................. 370/335; 370/342; 370/347; 375/140; 455/458
(58) Field of Classification Search ............. 370/252, 370/335, 342, 310, 347; 375/140; 455/434, 455/458
See application file for complete search history.

(56) References Cited

U.S. PATENT DOCUMENTS

| 6,216,004 B1 * | 4/2001 | Tiedemann et al. ......... 455/442 |
| 6,421,540 B1 * | 7/2002 | Gilhousen et al. .......... 455/458 |
| 6,711,413 B1 * | 3/2004 | Heidari ....................... 455/515 |
| 6,748,010 B1 * | 6/2004 | Butler et al. ................. 375/148 |
| 6,771,616 B1 * | 8/2004 | Abrishamkar et al. ...... 370/320 |
| 6,829,485 B1 * | 12/2004 | Abrishamkar et al. ...... 455/458 |

* cited by examiner

*Primary Examiner*—Ricky Ngo
*Assistant Examiner*—Richard Chang
(74) *Attorney, Agent, or Firm*—Philip Wadsworth; Bruce W. Greenhaus; Donald C. Kordich

(57) ABSTRACT

A system for efficiently employing a quick paging channel signal to determine the presence of a forthcoming primary paging channel signal adapted for use with a wireless communications system employing a quick paging channel and a primary paging channel. The system includes a first mechanism for calculating a first decision parameter representative of a quality of a signal environment through which the quick paging channel is propagating. A second mechanism calculates a second decision parameter representative of a value of the quick paging channel signal. A third mechanism indicates, based on the first decision parameter and the second decision parameter, the presence or absence of an immediately forthcoming page message on the primary paging channel.

30 Claims, 3 Drawing Sheets

WIRELESS COMMUNICATIONS RECEIVER EMPLOYING A UNIQUE COMBINATION OF QUICK PAGING CHANNEL SYMBOLS TO FACILITATE DETECTION OF A PRIMARY PAGING CHANNEL

This application is a non-provisional application claiming priority to provisional application Ser. No. 60/176,463, filed on Jan. 17, 2000.

BACKGROUND OF THE INVENTION

1. Field of Invention

This invention relates to wireless communications systems. Specifically, the present invention relates to receivers for demodulating quick paging channels in wireless communications systems employing slotted quick paging channels and primary paging channels.

2. Description of the Related Art

Wireless communications systems are employed in a variety of demanding applications ranging from search and rescue to Internet applications. Such applications require reliable, cost-effective, and space-efficient communications systems with accompanying wireless phones having maximum battery life and associated standby time.

Cellular telecommunications systems, such as Code Division Multiple Access (CDMA) communications systems, are often characterized by a plurality of mobile stations (e.g. cellular telephones, mobile units, wireless telephones, or mobile phones) in communication with one or more Base Station Transceiver Subsystems (BTSs). Signals transmitted by the mobile stations are received by a BTS and often relayed to a Mobile Switching Center (MSC) having a Base Station Controller (BSC). The MSC then routes the signal to a Public Switched Telephone Network (PSTN) or to another wireless phone. Similarly, a signal may be transmitted from the PSTN to a wireless phone via a base station or BTS and an MSC.

Wireless communications networks often employ various channels, such as paging channels and traffic channels, as disclosed in the IS-95 cellular telephone standard, to facilitate communications between a wireless phone and a BTS. Paging messages are transmitted over a paging channel by a BTS to an associated wireless phone to indicate an incoming call. When a wireless phone detects a paging message, a sequence of service negotiation messages is transmitted between the wireless phone and an associated BTS to establish a traffic channel. A traffic channel typically supports voice and data traffic.

Conventionally, a wireless telephone continuously monitors the paging channel for pages indicative of incoming calls. The receiver of the wireless phone remains on while signal processing circuitry within the wireless phone demodulates the paging channel to determine if a page was sent. Unfortunately, the receiver draws excess power, which significantly limits phone battery life.

Systems for minimizing wireless phone power consumption are often employed in the wireless phone and/or accompanying network to extend phone battery life, i.e., standby time. To improve standby time, some newer wireless phones operate in slotted mode. In slotted mode, the receiver of the wireless phone is periodically activated in accordance with predetermined paging slots established in accordance with the IS-95 telecommunications standard. An associated BTS transmits pages during the paging slots. Wireless phone standby time is extended by periodically powering-up the receiver and demodulating the paging channel rather than continuously demodulating the primary paging channel as done previously.

Unfortunately, paging channel messages are often long and require extensive processing, which increases phone power consumption and reduces battery life and associated standby time. Furthermore, the design of such systems and the associated paging channels necessitates redundant processing of the lengthy paging channel messages to detect incoming calls. This further reduces phone battery life.

Further increases in phone standby time are achieved via a relatively new addition to the IS-95 telecommunications standard known as offline processing. In a wireless communications network employing offline processing, a pair of Quick Paging Channel (QPCH) symbols is periodically transmitted to the wireless phone. The quick paging channel symbols, i.e., quick pages, indicate the presence or absence of an incoming call to be established on a forthcoming traffic channel (F-CCCH). The QPCH symbols arrive in pairs at 9600 bits per second (bps) or 4800 bps. The time slots at which the QPCH symbols are transmitted from an associated BTS are known by the wireless phone, which periodically powers-up the receiver at corresponding time slots.

In a wireless phone employing offline processing, the wireless phone receiver powers-up, samples the QPCH, then immediately powers-down the receiver and processes the QPCH sample offline (when the receiver is off). Subsequent analysis of the QPCH sample or samples indicates whether the wireless phone should power-up the receiver and demodulate the paging channel to receive an incoming page associated with an incoming call. Use of the QCPH helps minimize receiver activation time and the instances of complete paging channel demodulation, enabling a reduction in wireless phone power consumption and an associated extension in phone battery life. Unfortunately, existing systems and methods for demodulating the QPCH and deciding whether or not to process the subsequent primary paging channel based on the QPCH are undesirably large, expensive, consume excess power, and are generally inefficient. Furthermore, existing systems often fail to effectively employ both symbols of the QPCH to effectively determine whether to process the forthcoming primary paging channel.

Hence, a need exists in the art for an efficient and cost effective system and method for receiving and processing quick paging channel symbols to determine whether to process the forthcoming primary paging channel. There exists a further need for an efficient system and method that employs both symbols of each quick paging channel slot to reliably detect the presence of an incoming page via minimal hardware.

SUMMARY OF THE INVENTION

The need in the art is addressed by the system for efficiently employing a quick paging channel signal to determine the presence of a forthcoming primary paging channel signal of the present invention. In the illustrative embodiment, the inventive system is adapted for use with a wireless communications system employing a quick paging channel and a primary paging channel. The system includes a first mechanism for calculating a first decision parameter representative of a quality of a signal environment through which the quick paging channel is propagating. A second mechanism calculates a second decision parameter representative of a value of the quick paging channel signal. A third mechanism indicates, based on the first decision parameter and the second decision parameter, the presence or absence of an immediately forthcoming page message on the primary paging channel.

In a specific embodiment, the first decision parameter is based on a pilot signal and a carrier signal to interference ratio associated with the quick paging channel signal. The second decision parameter is based on a combination of the quick paging channel signal and the pilot signal.

In a more specific embodiment, the system further includes fourth mechanism for processing the forthcoming page message when the third mechanism indicates the presence of a forthcoming page on the primary paging channel. A fifth mechanism establishes a traffic channel in accordance with the forthcoming page message. A sixth mechanism compares the first decision parameter to a first threshold and selectively activates the fourth mechanism when the first decision parameter is approximately less than the first threshold. A seventh mechanism compares the second decision parameter to a second threshold when the first decision parameter is approximately greater than the first threshold. An eighth mechanism selectively activates the forth mechanism when the second decision parameter is greater than the second threshold. An additional mechanism powers down a receiver section of a wireless communications device associated with the system if the second decision parameter is approximately less than the second threshold.

The first decision parameter is specified by the following equation:

$$CSI = \left(\frac{E_{pilot}}{\hat{I}o}\right)_{combined} = \frac{E_{pilot1}}{\hat{I}_{o1}} + \frac{E_{pilot2}}{\hat{I}_{o2}},$$

where CSI and $$\left(\frac{E_{pilot}}{\hat{I}o}\right)_{combined}$$

represent the combined carrier signal to interference ratio;

$$\frac{E_{pilot1}}{\hat{I}_{o1}}$$

represents the pilot energy to interference ratio associated with the first quick paging symbol; and $$\frac{E_{pilot2}}{\hat{I}_{o2}}$$

represents the pilot energy to interference ratio associated with the second quick paging symbol, where $E_{pilot1}$ and $E_{pilot2}$ represent pilot signal energy summed over all multipaths and associated with the first symbol and the second symbol, respectively; and $\hat{I}_{o1}$ and $\hat{I}_{o2}$ are estimates of the total energy of the received signal associated with the first symbol and the second symbol, respectively.

The second decision parameter is specified by the following equation:

$$D = \frac{QP_1 + QP_2}{E_{pilot1} + E_{pilot2}},$$

where $QP_1$ is the dot product, cross product, or combination thereof of in-phase and quadrature signal components of the pilot signal and the quick paging signal associated with the first quick paging symbol; $QP_2$ is the dot product, cross product, or combination thereof of in-phase and quadrature signal components of the pilot signal and the quick paging signal associated with the second quick paging symbol; and $E_{pilot1}$ and $E_{pilot2}$ are as defined above.

The novel design of the present invention is facilitated by the third means that uniquely employs two novel decision parameters CSI and D based on first and second quick paging channel symbols of a quick paging channel slot to accurately determine the presence or absence of a forthcoming page message on the primary paging channel.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
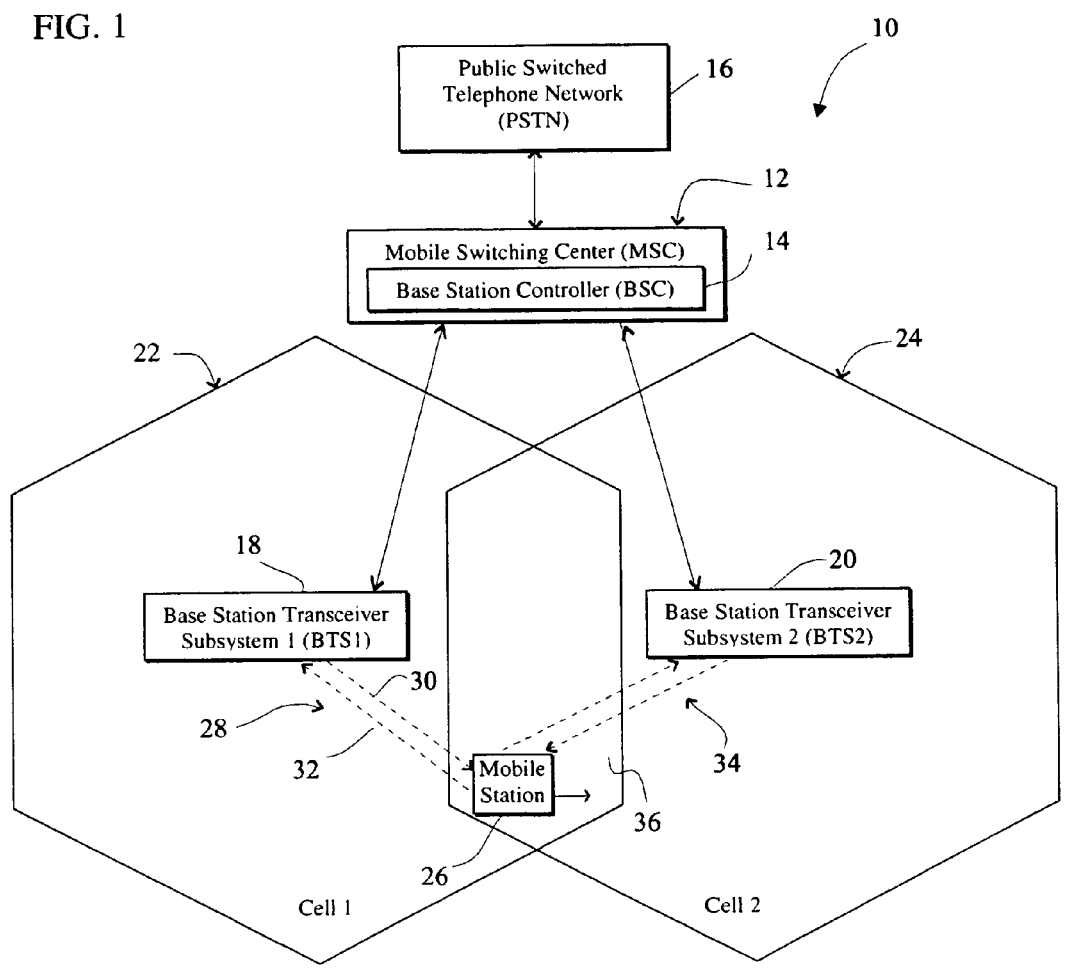
FIG. 1 is a diagram of an exemplary wireless communications system constructed in accordance with the teachings of the present invention.

FIG. 1 is a block diagram of an exemplary wireless communications system 10 for which the present invention is adapted. The system 10 includes a Mobile Switching Center (MSC) 12 having a Base Station Controller (BSC) 14. A Public Switched Telephone Network (PSTN) 16 routes calls from telephone lines and other networks and communications devices (not shown) to and from the MSC 12. The MSC 12 routes calls from the PSTN 16 to and from a first BTS 18 and a second BTS 20 associated with a first cell 22 and a second cell 24, respectively. The BTS's 18 and 20 are often called cell controllers.

The MSC 12 routes calls between the BTS's 18 and 20. The first BTS 18 directs calls to the first mobile station 26 within the first cell 22 via a first communications link 28. The communications link 28 is a two-way link having a forward link 30 and a reverse link 32. Typically, when the BTS 18 has established voice communications with the mobile station 26, the link 28 is characterized as a traffic channel. While only two BTS's 18 and 20 are shown in FIG. 1, more BTS's or fewer BTS's may be employed without departing from the scope of the present invention.

When the mobile station 26 moves from the first cell 22 to the second cell 24, the mobile station 26 is handed off to the second BTS 20. Handoff typically occurs in an overlap region 36 where the first cell 22 overlaps the second cell 24. In a soft handoff, the mobile station 26 establishes a second communications link 34 with the target BTS 20 in addition to the first communications link 28 with the source BTS 18. During a soft handoff, both the first link 28 and the second link 34 are maintained simultaneously. After the mobile station 26 has crossed into the second cell 24, it may drop the first communications link 28. In a hard handoff, the communications link 34 is not established. When the mobile station 26 moves from the first cell 22 to the second cell 24, the link 28 to the source BTS 18 is dropped and a new link is formed with the target BTS 20.

Figure 2:
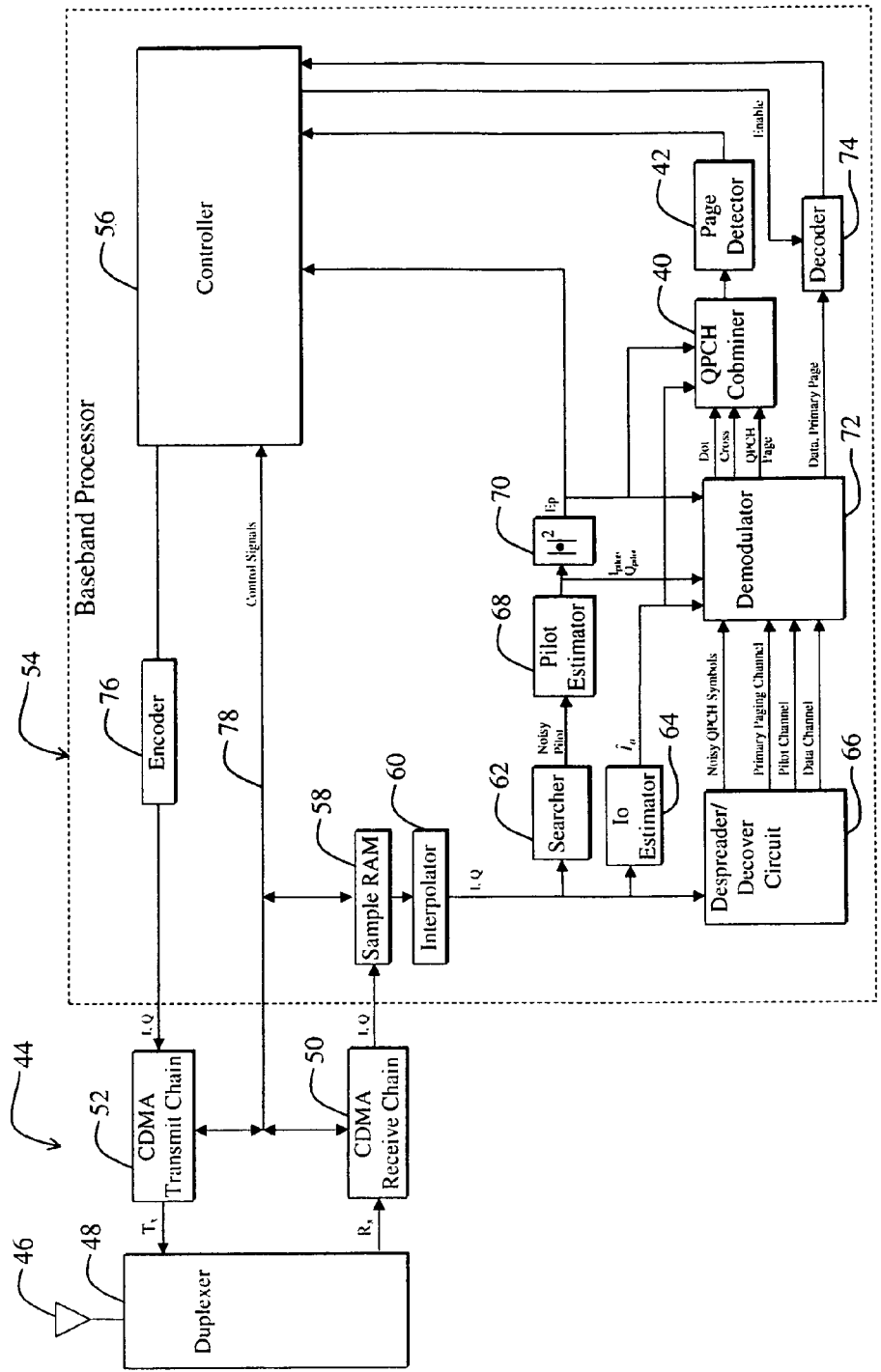
FIG. 2 is a more detailed diagram of the mobile station of FIG. 1 showing a unique QPCH combiner and QPCH detector constructed in accordance with the teachings of the present invention.

FIG. 2 is a more detailed diagram of the wireless phone, i.e., mobile station 26 of FIG. 1 showing a unique Quick Paging Channel (QPCH) combiner (demodulation symbol (D) computer) 40 and QPCH detector 42 constructed in accordance with the teachings of the present invention. For clarity, various components are omitted from FIG. 2, such as Intermediate Frequency (IF) to baseband converters, mixers, downconverters, oscillators, timers, power supplies, and amplifiers, however those skilled in the art will know where and how to implement the additional requisite components.

The mobile station 26 includes a transceiver 44 having an antenna 46 that is connected to a duplexer 48. The duplexer 48 is connected to an input of a CDMA receiver section 50 and to an output of a CDMA transmitter 52. A baseband processor 54 is connected to the CDMA transceiver 44 and includes a controller 56, a sample Random Access Memory (RAM) 58, an interpolator 60, a searcher 62, a received energy estimator 64, a despreader/decover circuit 66, a Pilot Estimator (pilot filter) 68, a pilot energy computation circuit 70, a demodulator 72, the QPCH combiner 40, the QPCH page detector 42, a Viterbi decoder 74, QPCH memory 80, and an encoder 76.

The controller 56 is connected to a bus 78 that provides control input to the CDMA transmitter 52 and the CDMA receiver 50. An output of the CDMA receiver 50 is a digital receive signal that is provided as input to the sample RAM 58 of the baseband processor 54. An output of the sample RAM 58 is input to the interpolator 60. An output of the interpolator 60 is connected to inputs of the searcher 62, and the despreader/decover circuit 66. An output of the searcher 62 represents peaks corresponding to candidate pilot signals, which are input to the controller software/circuitry 56. A pilot output of the despreader/decover circuit 66 represents a pilot signal estimate(s) that has k in-phase ($I_{pilot_k}$) and quadrature ($Q_{pilot_k}$) signal components, one $I_{pilot_k}$ and $Q_{pilot_k}$ component for each $k^{th}$ multipath signal component. The pilot output of the despreader/decover circuit 66 provides input to the pilot estimator (pilot filter) 68. The output of the pilot estimator 68 represents a filtered pilot estimate(s) and is input to the demodulator 72 and the pilot energy computation circuit 70. An output of the pilot energy computation circuit 70 is connected to an input of the QPCH combiner 40.

Traffic/data channel, primary (full) paging channel, and QPCH channel outputs of the despreader/decover circuit 66 are input to the demodulator 72. A dot product, cross product, and/or dot product+cross product output, and a QPCH page output of the demodulator 72 are provided as input to the QPCH combiner 40. Traffic and primary paging channel outputs are provided as input to the Viterbi decoder 74 after further processing via subsystems (not shown) such as scaling circuits and de-interleaving circuits (see IS-95 specifications). An output of the decoder 74 is connected to an input of the controller 56. The QPCH combiner 40 communicates with the page detector 42, an output of which is connected to an input of the controller 56. A QPCH memory 80 receives inputs from the QPCH combiner 40 and the controller software/circuitry 56 and provides output to the page detector 42.

In operation, CDMA signals received via the antenna 46 are directed to the CDMA receiver 50 via the duplexer 48. The CDMA receiver 50 includes radio frequency to intermediate frequency conversion circuitry (not shown) for mixing the received radio frequency signals (Rx) to intermediate frequency signals. Automatic Gain Control (AGC) circuitry (not shown) adjusts the total power of the received signal to a predetermined value. Additional frequency conversion circuitry (not shown) mixes the intermediate frequency signals to analog baseband signals, which are then converted to digital base band signals via an analog-to-digital converter (not shown). The digital baseband signals include In-phase (I), Quadrature (Q), and noise signal components.

Similarly, the CDMA transmitter 52 includes frequency conversion circuitry (not shown) for converting digital input signals (having in-phase and quadrature signal components) output from the encoder 76 to analog radio frequency signals in preparation for transmission via the antenna 46.

The sample RAM 58 in the baseband processor 54 samples the digital baseband signals received from the CDMA receiver 50 at predetermined time slots. The sample RAM 58 maintains the samples in a buffer (not shown) for use by offline processing circuitry as discussed more fully below. The predetermined time slots at which the sample RAM 58 performs sampling of the received signal are determined in accordance with IS-95 telecommunications standards. The sample RAM 58 may be selectively bypassed when the mobile station 26 is not operating in slotted mode via an enable signal received from the controller 56. Other systems and methods for selectively bypassing the sample RAM 58 may be employed without departing from the scope of the present invention.

The length of the signal sample taken by the sample RAM 58 is directly related to the size of the sample RAM 58. The sample RAM 58 samples the signal environment, i.e., the received signal, to gather sufficient information from a QPCH of the received signal to facilitate offline processing. As discussed more fully below, the unique design of the present invention helps minimize the required size of the sample RAM 58.

An output of the sample RAM 58 is connected to the interpolator 60. The interpolator 60 upconverts a digital signal output from the sample RAM 58 to a higher digital frequency. In the present specific embodiment, the rate of the digital signal output from the sample RAM 58 is equivalent to the rate of the received digital signal, which is twice the chip rate. The interpolator 60 converts the rate of the digital signal to eight times the chip rate (CHIP×8). Those skilled in the art will appreciate that the exact rates of digital signals employed by the mobile station 26 are application-specific and may be determined by one skilled in the art to meet the needs of a given application.

When the sample RAM 58 has sampled the received signal, the interpolator 60 provides an up-converted digital signal having in-phase and quadrature signal components to the searcher 62 and the despreader/decover circuit 66. The searcher 62 analyzes the received digital signal and outputs candidate pilot peaks (one peak for each multipath component) to the controller software/circuitry 56.

In one embodiment of the present invention, the searcher 62 is implemented in accordance with the teachings of U.S. patent application Ser. No. 09/696,160, filed, Oct. 23, 2000, by the inventor of the present invention, entitled "EFFICIENT SYSTEM AND METHOD FOR FACILITATING QUICK PAGING CHANNEL DEMODULATION VIA AN EFFICIENT OFFLINE SEARCHER IN A WIRELESS COMMUNICATIONS SYSTEM", assigned to the assignee of the present invention and incorporated herein by reference. Alternatively, the searcher 62 may be implemented as a pilot despreader that may be constructed by one skilled in the art with access to the present teachings, without departing from the scope of the present invention.

The pilot estimator 68 is implemented as a Finite Impulse Response Filter (FIR) or an Infinite Impulse Response Filter (IIR). The pilot estimator 68 filters noise from the noisy pilot signal provided by the searcher 62 and provides a pilot signal estimate ($\hat{P}_k$) in response thereto. The pilot signal estimate $\hat{P}_k$ includes in-phase ($I_{pilot_k}$) and quadrature ($Q_{pilot_k}$) signal components associated with the $k^{th}$ pilot multipath signal component and is represented by the following ($\hat{P}_k$):

$$\hat{P}_k = (I_{pilot_k}, Q_{pilot_k}), \quad [1]$$

An additional subscript, such as 1 or 2 is added to specify whether a given signal component corresponds to a first symbol or a second symbol, respectively, of a slot of a received QPCH signal. For example, $\hat{P}_{1_k} = (I_{pilot1_k}, Q_{pilot1_k})$ refers to the $k^{th}$ multipath pilot estimate associated with the first QPCH symbol. A pilot signal is associated with or corresponds to a QPCH symbol when the pilot signal is received approximately simultaneously with the QPCH symbol and is provided in the same signal sample of the sample RAM 58.

The pilot signal estimate $\hat{P}$ is provided to the demodulator 72 and the pilot energy computation circuit 70. The pilot energy computation circuit 70 squares the pilot signal estimate $\hat{P}$ and provides an estimate of the energy ($E_{pilot_k}$) of the $k^{th}$ pilot multipath signal component to the QPCH combiner 40. The pilot energy $E_{pilot_k}$ includes a first component $E_{pilot1_k}$ associated with the first QPCH symbol of a QPCH slot and a second component $E_{pilot2_k}$ associated with the second QPCH symbol of the QPCH slot. The QPCH combiner 40 includes an integrator (not shown) for summing the pilot energies $E_{pilot1_k}$ and $E_{pilot2_k}$ over the k pilot multipaths to yield $E_{pilot1}$ and $E_{pilot2}$, respectively, in accordance with the following equations:

$$E_{pilot1} = \sum_k E_{pilot1_k}, \quad [2]$$

$$E_{pilot2} = \sum_k E_{pilot2_k}, \quad [3]$$

where $E_{pilot1_k}$ is the pilot energy associated with the $k^{th}$ multipath signal component of the first QPCH symbol of a QPCH slot, and $E_{pilot2_k}$ is the pilot energy associated with the $k^{th}$ multipath signal component of the second QPCH symbol of the QPCH slot.

The despreader/decover circuit 66 includes a pseudo-noise despreader (not shown) and an M-ary Walsh decover circuit (not shown) for decovering a pilot channel, a data channel, a primary paging channel, and a QPCH from the received signal output from the interpolator 60, if they exist in the received signal. M is 64 in the present embodiment. The decovered channels are provided to the demodulator 72.

The demodulator 72 computes the dot product, cross product, or both (depending on the communications mode of the system 26 as discussed more fully below) between a QPCH signal received from the despreader/decover circuit 66 and the pilot estimate $\hat{P}_k$ output from the pilot estimator 68. In the present specific embodiment, the QPCH signal includes a slot having a first symbol and a second symbol defined in accordance with the IS-95 telecommunications standard.

The dot product ($dot_1$) of the first QPCH symbol (QPCH1) with the corresponding pilot estimate $\hat{P}_{1_k}$ is defined in accordance with the following equation:

$$dot_1 = \sum_k (I_{pilot1_k} I_{QPCH1_k} + Q_{pilot1_k} Q_{QPCH1_k}), \quad [4]$$

where k is the number of available multipath components of the received signal; $I_{pilot1_k}$ is the in-phase component of the pilot estimate associated with $k^{th}$ multipath component of the first QPCH symbol of the slot; $I_{QPCH1_k}$ is the in-phase component of the $k^{th}$ multipath component of the first QPCH symbol; $Q_{pilot1_k}$ is the quadrature component of the $k^{th}$ multipath component of the pilot estimate associated with the first QPCH symbol; $Q_{QPCH1_k}$ is the quadrature component of the $k^{th}$ multipath component of the first QPCH symbol of the QPCH signal.

Similarly, the dot product ($dot_2$) of the second QPCH symbol (QPCH2) with the corresponding pilot estimate $\hat{P}_{2_k}$ is defined in accordance with the following equation:

$$dot_2 = \sum_k (I_{pilot2_k} I_{QPCH2_k} + Q_{pilot2_k} Q_{QPCH2_k}), \quad [5]$$

where the individual symbols are similar to those defined above for equation (4) but are associated with the second QPCH symbol of a slot rather than the first QPCH symbol of the slot.

Additional details of quick paging channels employed for the purposes of offline processing are disclosed in copending U.S. patent application Ser. No. 08/865,650, filed May 30, 1997, by Butler, et al., entitled DUAL CHANNEL SLOTTED PAGING, assigned to the assignee of the present invention and incorporated herein by reference. Further QPCH details are disclosed in copending U.S. patent application Ser. No. 09/252,846, filed Feb. 19, 1999, by Agrawal, et al., entitled A METHOD AND APPARATUS FOR MAXIMIZING STANDBY TIME USING A QUICK PAGING CHANNEL, assigned to the assignee of the present invention and incorporated herein by reference.

The demodulator 72 computes the first dot product ($dot_1$) associated with the first QPCH symbol, the second dot product ($dot_2$) associated with the second QPCH symbol, and/or the cross products $cross_1$ and $cross_2$ associated with the first and second QPCH symbols, respectively, and provides the results to the QPCH combiner 40. The cross products $cross_1$ and $cross_2$ are defined in accordance with the following equations:

$$cross_1 = \sum_k (I_{pilot1_k} Q_{QPCH1_k} - Q_{pilot1_k} I_{QPCH1_k}), \quad [6]$$

$$cross_2 = \sum_k (I_{pilot2_k} Q_{QPCH2_k} - Q_{pilot2_k} I_{QPCH2_k}), \quad [7]$$

where the individual symbols are as defined above for equations (4) and (5).

Whether the demodulator 72 computes dot products, cross products, or sums of dot and cross products is application-specific and depends on the mode of the system 26. For example, in 1 Multi-Carrier (1×MC) systems without Orthogonal Transmit Diversity (OTD) (1×MC non OTD), the demodulator 72 computes dot and cross products in accordance with equations (4) through (7) and outputs $dot_1+cross_1$ and $dot_2+cross_2$ to the QPCH combiner 40. In 3 Multi-Carrier (3×MC) systems and in 1×MC systems with OTD, the demodulator 72 outputs dot products, cross products, or sums of dot and cross products depending on the needs of a given application. With reference to the present teachings, the appropriate demodulator output may be determined by one ordinarily skilled in the art to meet the needs of a given application. The additions of the dot and cross products ($dot_1+cross_1$ and $dot_2+cross_2$) may be performed in the QPCH combiner 40 without departing from the scope of the present invention.

The output of the demodulator 72 that is input to the QPCH combiner 40 is denoted $QP_1$ for outputs associated with the first QPCH symbol of a slot and $QP_2$ for outputs associated with the second QPCH symbol of a slot. Various outputs of the demodulator 72 for various system modes are summarized in the following table:

TABLE 1

| Mode | Quick Page Calculation (QP) |
|---|---|
| 1 × MC non OTD | $QP_1 = dot_1 + cross_1$, $QP_2 = dot_2 + cross_2$, |
| 1 × MC OTD, or 3 × MC | $QP_1 = dot_1$, $cross_1$, or $dot_1 + cross_1$ $QP_2 = dot_2$, $cross_2$, or $dot_2 + cross_2$ |

Alternatively, another combinative function of the pilot estimate and the first and second QPCH symbols may be provided to the QPCH combiner 40 in addition to or instead of the dot and/or cross products, without departing from the scope of the present invention.

The demodulator 72 may also provide a data/traffic signal, if available, to the Viterbi decoder 74 when the mobile station 26 is handling a call or other type of traffic channel. The decoder 74 may then decode the data/traffic signal, which may represent voice or another type of data, and forward the decoded signal to the controller 56. The controller 56 employs various hardware and/or software modules (not shown) to route the decoded signals to a microphone or to another software or hardware function (not shown).

The QPCH combiner 40 employs the Quick Paging (QP) values $QP_1$ and $QP_2$, the pilot energy estimates $E_{pilot1}$ and $E_{pilot2}$, and received signal energy estimates $\hat{I}_{o1}$ and $\hat{I}_{o2}$ associated with the first and second QPCH symbols, respectively, to compute a first decision parameter (CSI) and a second decision parameter (D). The second decision parameter D is also called the demodulation symbol. The first decision parameter CSI is a carrier signal to interference ratio and is described by the following equation:

$$CSI = \left(\frac{E_{pilot}}{\hat{I}_o}\right)_{combined} = \frac{E_{pilot1}}{\hat{I}_{o1}} + \frac{E_{pilot2}}{\hat{I}_{o2}}, \quad [8]$$

where CSI is equivalent to $$\left(\frac{E_{pilot}}{\hat{I}_o}\right)_{combined},$$

which is the combined pilot to interference ratio for the first and second QPCH symbols; $E_{pilot1}$ is the energy of the portion of the pilot signal received simultaneously with the first QPCH symbol; $E_{pilot2}$ is the energy of the portion of the pilot signal received simultaneously with the second QPCH symbol; $\hat{I}_{o1}$ is total the energy of the portion of the received signal, including noise and interference, received simultaneously with the first QPCH symbol; and $\hat{I}_{o2}$ is total the energy of the portion of the received signal, including noise and interference, received simultaneously with the second QPCH symbol. In the present specific embodiment, $\hat{I}_{o1}$ and $\hat{I}_{o2}$ are predetermined via AGC circuitry and Gain Control Amplifiers (GCA's) (not shown) in the CDMA receive chain 50, however, $\hat{I}_{o1}$ and $\hat{I}_{o2}$ may be estimated via energy estimators or determined via other mechanisms without departing from the scope of the present invention.

The second decision parameter D is a novel decision metric that is described by the following equation:

$$D = \frac{QP_1 + QP_2}{E_{pilot1} + E_{pilot2}}, \quad [9]$$

where $QP_1$ is either $dot_1$, $cross_1$, or $dot_1+cross_1$ as indicated in table 1; $QP_2$ is either $dot_2$, $cross_2$, or $dot_2+cross_2$ as indicated in table 1; and $E_{pilot1}$ and $E_{pilot2}$ are as described above.

The QPCH combiner 40 combines the parameters CSI and D over all available multipath components and provides the results to the QPCH page detector 42. A copy of the results of equations (8) and (9) are stored in the QPCH memory 80, which may be selectively accessed via the page detector 42 in response to an enable signal from the controller software/circuitry 56. With access to the present teachings, those skilled in the art may build a QPCH combiner suitable for use with the present invention.

The QPCH page detector 42 employs the parameters CSI and D to determine whether the mobile station 26 should subsequently power up the CDMA receiver 50 to receive and process a forthcoming page sent via the primary paging channel. The QPCH page detector 42 initially compares the CSI parameter to an erasure threshold $T_{erasure}$. If $CSI > T_{erasure}$, then erasure is declared. The erasure threshold $T_{erasure}$ is set so that when erasure is declared, the signal environment through which received signals are propagating is corrupted with noise or other interference, and the QPCH cannot accurately indicate the presence or absence of a forthcoming page message on a primary paging channel. Consequently, the forthcoming paging channel is processed to prevent the unnecessary dropping of calls.

When $CSI > T_{erasure}$, an appropriate indication is sent to the controller 56 indicating that the CDMA receiver 50 should be activated in accordance with IS-95 standards to receive and demodulate a forthcoming primary paging channel. The controller 56 then activates the CDMA receiver 50 and places the sample RAM 58 in bypass mode via control signals delivered via the bus 78 at a time corresponding to a slot during which the primary paging channel is to be received. The Viterbi decoder 74 is automatically enabled via signaling information encoded in each packet and decodes the primary paging channel or traffic channel input from the demodulator 72. The decoded primary paging channel or traffic channel is provided to the controller software/circuitry 56.

When the mobile station 26 receives the full page via the primary paging channel, the page is despread via the despreader/decover circuit 66, combined over multipath components via the demodulator 72 and provided to the decoder 74, where the page is decoded and constituent page information is forwarded to the controller 56. Software and/or hardware circuitry known in the art (not shown) within the controller 56 interprets the page. If the full page indicates a forthcoming traffic channel, the controller 56 issues appropriate control commands to various modules within the mobile station 26 to prepare the mobile station 26 to handle the forthcoming traffic channel.

If $CSI<T_{erasure}$, the decision parameter (demodulation symbol) D is compared to an on-off threshold $T_{1/0}$. If $D>T_{1/0}$, then an indication is provided to the controller 56 indicating that the forthcoming primary paging channel should be processed in accordance with IS-95 standards. The controller 56 then takes appropriate steps to prepare the mobile station 26 for the receipt of the primary paging channel and the processing of the associated page.

If $D<T_{1/0}$, then an indication specifying that a full page on the primary paging channel is not forthcoming is sent to the controller 56. The controller 56 then powers-down the transceiver section 44 and enters the mobile station 26 into a sleep state as defined in accordance with IS-95 telecommunications standards.

The QPCH is On-Off Keying (OOK) modulated, and the value of D is used to indicate the presence or absence (on or off, respectively) of a forthcoming paging channel. The exact values of the erasure threshold $T_{erasure}$ and the on-off threshold $T_{1/0}$ are application-specific and may be determined by one skilled in the art to meet the needs of a given application.

Figure 3:
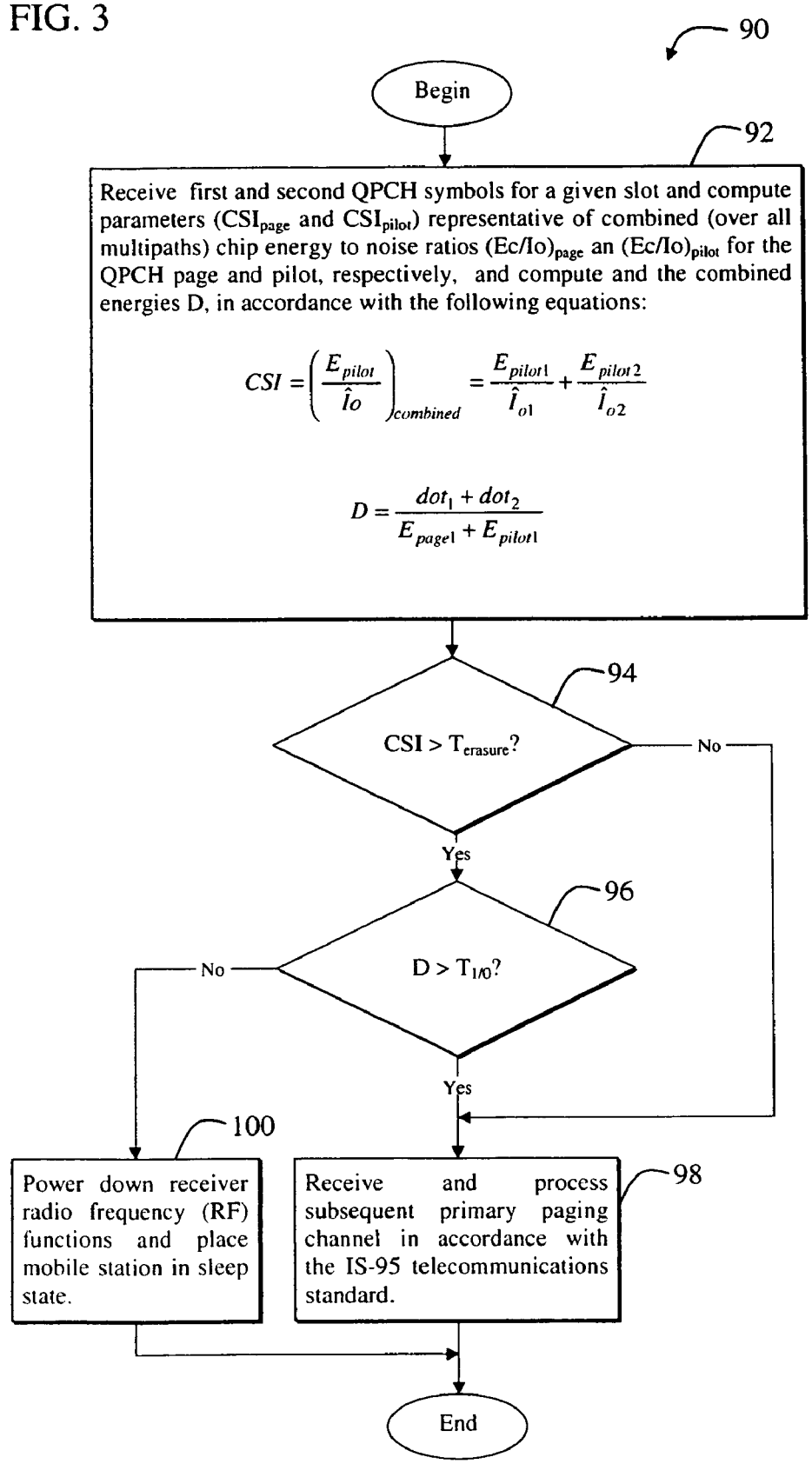
FIG. 3 is a flow diagram of a method implemented by the mobile station of FIG. 2 via the QPCH combiner and QPCH detector of FIG. 2.

FIG. 3 is a flow diagram of a method 90 implemented by the mobile station 26 of FIG. 2 via the QPCH combiner 40 and QPCH detector 42 of FIG. 2. With reference to FIGS. 2 and 3, in an initial calculation step 90, the sample RAM 58 samples the received signal at a predetermined time interval corresponding to the transmission of a QPCH signal having a slot with a first QPCH symbol and a second QPCH symbol. The signal sample is then analyzed as described above, to yield $QP_1$, $QP_2$, $\hat{P}_1$, $\hat{P}_2$, $\hat{I}_{o1}$, $\hat{I}_{o2}$, and $E_{pilot1}$, $E_{pilot2}$, which are employed by the QPCH combiner 40 to compute CSI and D in accordance with equations (8) and (9), respectively. CSI and D are then passed to the QPCH detector 42, which implements a subsequent erasure-checking step 94 of the method 90 of FIG. 3.

In the erasure-checking step 94, CSI is compared to the predetermined erasure threshold $T_{erasure}$. If $CSI>T_{erasure}$, then control is passed to an on-off-checking step 96. Otherwise, control is passed to a paging channel processing step 98.

In the on-off-checking step 96, D is compared to the on-off threshold $T_{1/0}$. If $D>T_{1/0}$ then control is passed to the paging channel processing step 98. Otherwise, control is passed to a sleep step 100.

In the paging channel processing step 98, the forthcoming paging channel is received and processed in accordance with IS-95 telecommunications standards. In the sleep step 100, the mobile station 26 is placed in a sleep state, which includes the step of powering-down the CDMA transceiver 44. The sleep step 100 and the paging channel processing step 98 are implemented with the help of the controller 56.

The thresholds $T_{1/0}$ and $T_{erasure}$ are stored in the QPCH memory 80 associated with the page detector 42. With access to the present teachings, those skilled in the art will know how to pick appropriate values for the thresholds $T_{1/0}$ and $T_{erasure}$.

Those skilled in the art will appreciate that the present invention may be easily adapted for use with QPCH slots having more or less than two QPCH symbols without departing from the scope of the present invention. Furthermore, reciprocal values may be employed for the values CSI, D, $T_{1/0}$, and $T_{erasure}$, (or a combination thereof) in which case, the greater than signs (>) in steps 94 and 96 are reversed accordingly.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for efficiently employing a quick paging channel signal to determine the presence of a forthcoming primary paging channel signal in a wireless communications system employing a quick paging channel and a primary paging channel comprising:
first means for calculating a first decision parameter representative of a quality of a signal environment through which said quick paging channel is propagating;
second means for calculating a second decision parameter representative of a value of said quick paging channel signal; and
third means for indicating, based on said first decision parameter and said second decision parameter, the presence or absence of an immediately forthcoming page message on said primary paging channel;
wherein said first decision parameter is based on a pilot signal and a carrier signal to interference ratio associated with said quick paging channel signal.

2. The system of claim 1 wherein said second decision parameter is based on a combination of said quick paging channel signal and said pilot signal.

3. The system of claim 2 wherein said second decision parameter is further based on energies associated with said quick paging channel signal and said pilot signal.

4. The system of claim 3 further including fourth means for processing said forthcoming page message in response to an indication provided by said third means indicating the presence of a forthcoming page on said primary paging channel.

5. The system of claim 4 further including fifth means for establishing a traffic channel in accordance with said forthcoming page message.

6. The system of claim 5 wherein said third means includes sixth means for comparing said first decision parameter to a first threshold and selectively activating said fourth means when said first decision parameter is approximately less than said fast threshold.

7. The system of claim 6 wherein said third means includes seventh means for comparing said second decision, parameter to a second threshold when said first decision parameter is approximately greater than said first threshold.

8. The system of claim 7 wherein said third means includes eighth means for selectively activating said forth means when said second decision parameter is greater than said second threshold.

9. The system of claim 8 wherein said third means includes means for powering down a receiver section of a wireless communications device containing said system if said second decision parameter is approximately less than said second threshold.

10. The system of claim 9 wherein said first decision parameter is specified by the following equation:

$$CSI = \left(\frac{E_{pilot}}{\hat{I}o}\right)_{combined} = \frac{E_{pilot1}}{\hat{I}_{o1}} + \frac{E_{pilot2}}{\hat{I}_{o2}},$$

where CSI and $$\left(\frac{E_{pilot}}{\hat{I}o}\right)_{combined}$$

represent said combined carrier signal to interference ratio;

$$\frac{E_{pilot1}}{\hat{I}_{o1}}$$

represents the pilot energy to interference ratio associated with said first quick paging symbol; and $$\frac{E_{pilot2}}{\hat{I}_{o2}}$$

represents the pilot energy to interference ratio associated with said second quick paging symbol, where $E_{pilot1}$ and $E_{pilot2}$ represent pilot signal energy associated with said first symbol and said second symbol, respectively; and $\hat{I}_{o1}$ and $\hat{I}_{o2}$ are estimates of the total energy of said received signal received associated with said first symbol and said second symbol, respectively.

11. The system of claim 9 wherein said second decision parameter is specified by the following equation:

$$D = \frac{QP_1 + QP_2}{E_{pilot1} + E_{pilot2}},$$

where $QP_1$ is either $dot_1$, $cross_4$, or $dot_1+cross_j$; $QP_2$ is either $dot_2$, $cross_2$, or $dot_2+cross_2$; $E_{pilot}$ represents energy associated with said pilot signal that is associated with said first quick paging symbol; and $E_{pilot2}$ represents energy associated with said pilot signal that is associated with said first quick paging symbol.

12. A system for selectively demodulating a primary paging channel in a wireless communications system based on a quick paging channel comprising:

first means for extracting pilot signal and a quick paging signal from a received signal, said quick paging signal having a slot with a first quick paging symbol and a second quick paging symbol;

second means for estimating pilot signal strengths associated with said first quick paging symbol and said second quick paging symbol;

third means for computing page energies and pilot energies associated with said first and second quick paging symbols;

fourth means receiving and demodulating a forthcoming primary paging signal; and fifth means for selectively activating said fourth means, based on said pilot signal strengths, said page energies, said pilot energies, said pilot signal, and said paging signal.

13. The system of claim 12 wherein said signal strengths are carrier signal to interference ratios.

14. The system of claim 13 wherein said fifth means includes means for calculating a combined carrier signal to interference ratio based on said carrier signal to interference ratios.

15. The system of claim 14 wherein said combined carrier signal to interference ratio is calculated in accordance with the following equation:

$$CSI = \left(\frac{E_{pilot}}{\hat{I}o}\right)_{combined} = \frac{E_{pilot1}}{\hat{I}_{o1}} + \frac{E_{pilot2}}{\hat{I}_{o2}},$$

where CSI and $$\left(\frac{E_{pilot}}{\hat{I}o}\right)_{combined}$$

represents said combined carrier signal to interference ratio;

$$\frac{E_{pilot1}}{\hat{I}_{o1}}$$

represents the pilot energy to interference ratio associated with said first quick paging symbol, and $$\frac{E_{pilot2}}{\hat{I}_{o2}}$$

represents the pilot energy to interference ratio associated with said second quick paging symbol, where $E_{pilot1}$ and $E_{pilot2}$ represent pilot signal energy associated with said first symbol and said second symbol, respectively; and $\hat{I}_{o1}$ and $\hat{I}_{o2}$ are estimates of the total energy of said received signal associated with said first symbol and said second symbol, respectively.

16. The system of claim 15 wherein said fifth means includes erasure means for comparing said combined carrier signal to interference ratio to an erasure threshold and providing an erasure signal in response thereto.

17. The system of claim 15 wherein said fifth means includes means for activating said fourth means when said erasure signal indicates that said combined carrier signal to interference ratio is approximately below said threshold.

18. The system of claim 17 wherein said fifth means includes detection means for computing a decision metric (D) based on said pilot signal, said paging signal, and said pilot energies and said page energies and comparing said decision metric to a decision threshold and providing a decision signal in response thereto when said erasure signal indicates that said combined carrier signal to interference ratio is approximately above said threshold.

19. The system of claim 18 wherein said fifth means further includes means for powering down a receiver associated with said system when said decision signal indicates that said decision metric is less than said decision threshold.

20. The system of claim 18 wherein said fifth means further includes means for selectively enabling said fourth means when said decision signal indicates that said decision metric is approximately greater than said decision threshold.

21. The system of claim 18 wherein said decision metric D is computed in accordance with the following equation:

$$D = \frac{QP_1 + QP_2}{E_{pilot1} + E_{pilot2}},$$

where $QP_1$ equals $dot_1$, $cross_1$, or $dot_1 + cross_1$ and $QP_2$ equals $dot_2$, $cross_2$, or $dot_2 cross_2$.

22. A dual paging channel receiver comprising:
a receiver for receiving a radio frequency signal and providing a digital baseband signal in response thereto;
a received energy estimator for calculating a first energy associated with said digital baseband signal;
a pilot computation circuit for extracting an estimate of a pilot signal from said digital baseband signal and computing an energy estimate of said pilot signal;
a despreader circuit for extracting a quick paging channel signal component from said digital baseband signal;
a demodulator and combiner for selectively combining said quick paging channel signal component and said pilot signal to yield a decision metric;
a detector for providing an indication of the presence or absence of an immediately forthcoming page on a primary page on a primary paging channel of said received signal based on said decision metric.

23. The receiver of claim 22 further including means for receiving and processing said forthcoming page in accordance with the IS-95 telecommunications standard in response to said indication.

24. The receiver of claim 23 wherein said decision metric includes parameters associated with a first quick paging symbol and a second quick paging symbol of said quick paging channel signal.

25. A wireless communications device comprising:
first means for receiving a radio frequency signal and providing a digital baseband signal in response thereto and for transmitting radio frequency signals;
second means for calculating a first energy associated with said digital baseband signal provided by said first means;
third means for extracting an estimate of a pilot signal from said digital baseband signal provided by said first means and computing an energy estimate of said pilot signal;
fourth means for extracting a quick paging channel component from said digital baseband signal;
fifth means for selectively combining said quick paging channel signal component and said pilot signal to yield a decision metric;
sixth means providing an indication of the presence or absence of an immediately forthcoming page on a primary paging channel of said radio frequency signal received via said first means; and seventh means for selectively employing said first means, said fourth means, and fifth means to process a subsequent page of a primary paging channel in response to said indication and establishing a traffic channel in response to the processing of said subsequent page.

26. A system for interpreting a quick paging channel signal in a wireless communications system comprising:
first means for analyzing a received signal and a signal environment associated with said quick paging channel to determine if one or more symbols of said received signal are valid and providing a first indication in response thereto, wherein said one or more symbols include a first symbol and a second symbol, and wherein said first means includes means for analyzing said signal environment and providing a parameter indicative of said signal environment via a pilot signal included in said received signal;
second means for providing a value indicative of a message included in said quick paging channel based on said first indication and said one or more symbols; and
third means for indicating that said first symbol and said second symbol are unreliable based on said parameter and selectively disabling said second means in response thereto.

27. The system of claim 26 wherein said parameter is determined in accordance with the following equation:

$$CSI = \left(\frac{E_{pilot}}{\hat{I}_o}\right)_{combined} = \frac{E_{pilot1}}{\hat{I}_{o1}} + \frac{E_{pilot2}}{\hat{I}_{o2}},$$

where CSI and $$\left(\frac{E_{pilot}}{\hat{I}_o}\right)_{combined}$$

represents a combined carrier signal to interference ratio;

$$\frac{E_{pilot1}}{\hat{I}_{o1}}$$

is a pilot energy interference ratio associated with said symbol;

$$\frac{E_{pilot2}}{\hat{I}_{o2}}$$

is a pilot energy to interference ratio associated with said second symbol; $E_{pilot1}$ and $E_{pilot2}$ represent pilot signal energy associated with said first symbol and said second symbol, respectively; and $\hat{I}_{o1}$ and $\hat{I}_{o2}$ are estimates of the total energy of said received signal associated with said first symbol and said second symbol, respectively.

28. The system claim 26 wherein said second means includes means for selectively calculating the following metric (D):

$$D = \frac{QP_1 + QP_2}{E_{pilot1} + E_{pilot2}},$$

where $QP_1$ is either $dot_1$, $cross_1$, or $dot_1+cross_1$; $QP_2$ is either $dot_2$, $cross_2$, or $dot_2+cross_2$; $E_{pilot1}$ represents energy associated with said pilot signal that is associated with first quick paging symbol; and $E_{pilot2}$ represents energy associated with said pilot signal that is associated with said first quick paging symbol.

29. The system of claim 28 wherein said second means includes means for comparing one or more of said metrics to one or more predetermined thresholds and providing said value in response thereto.

30. A system for interpreting a quick paging channel signal in a wireless communications system comprising:
 a receiver circuit having an antenna and a receive chain, wherein said receiver circuit further includes:
  a sample random access memory (RAM) connected at an output of said receive chain,
  an interpolator connected at an output of said sample random access memory, wherein said sample RAM and said interpolator are included in a digital baseband processor, and
  a despreading circuit including a demodulator;
 a pilot estimation circuit in communication with said receiver, wherein said pilot estimation circuit includes a pilot estimator in communication with a pilot energy computation circuit;
 a total received energy computation circuit in communication with said receiver;
 a quick paging channel symbol combiner in communication with said pilot estimation circuit, said total received energy computation circuit, and receiver; and
 a page detector in communication with said quick paging channel symbol combiner.

* * * * *